UNITED STATES PATENT OFFICE.

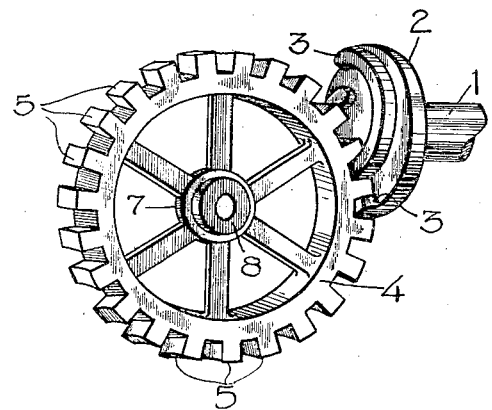
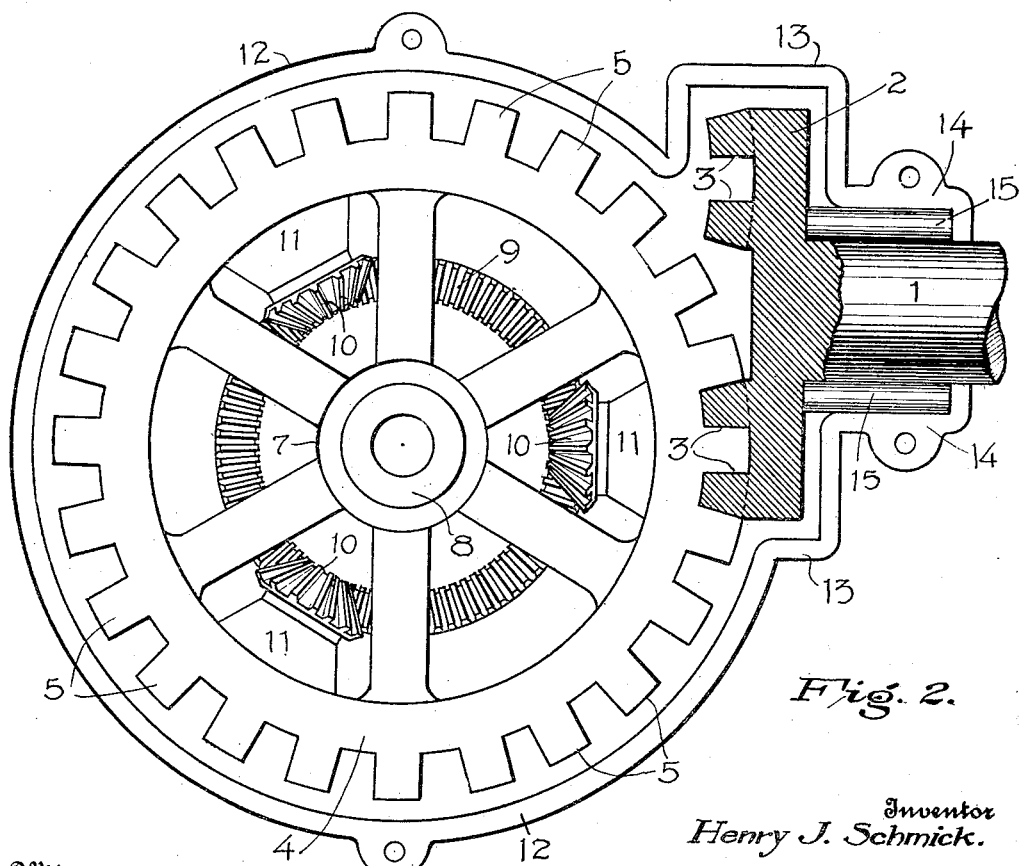

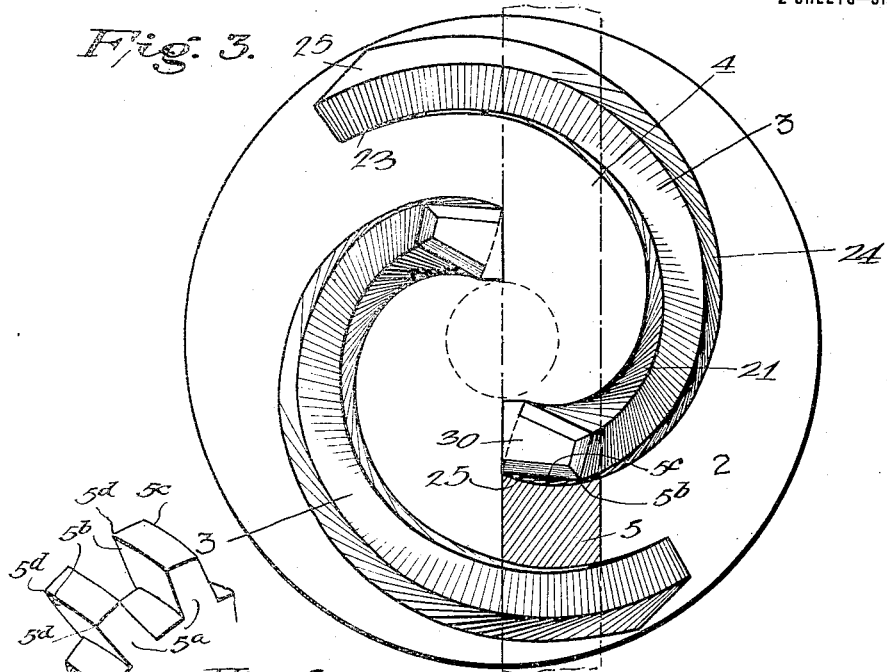
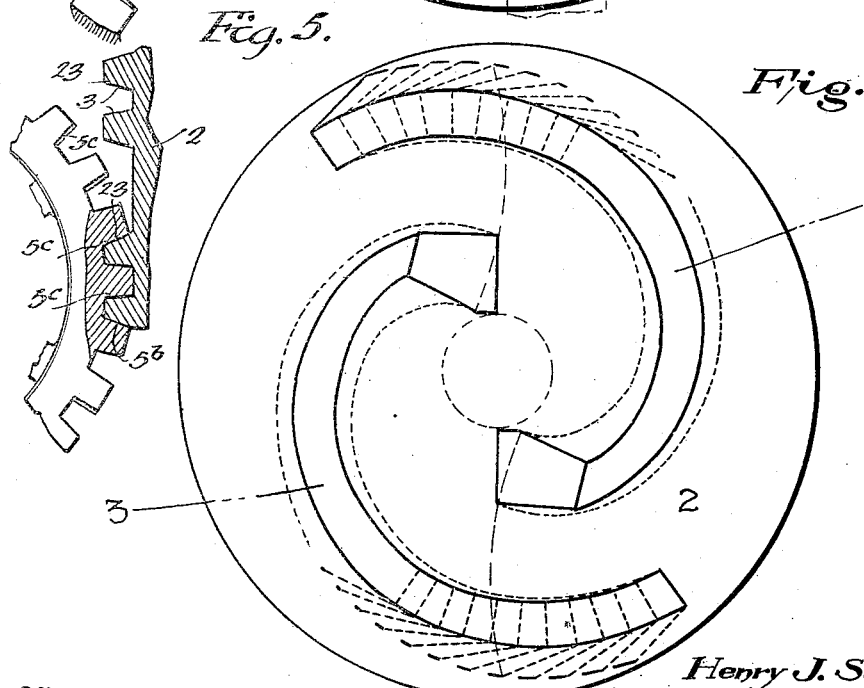

HENRY J. SCHMICK, OF LOCK HAVEN, PENNSYLVANIA.

AUTOMOBILE DRIVE MECHANISM.

1,245,621.  Specification of Letters Patent.  Patented Nov. 6, 1917.

Application filed November 25, 1914. Serial No. 873,929.

*To all whom it may concern:*

Be it known that I, HENRY J. SCHMICK, a citizen of the United States, residing at Lock Haven, in the county of Clinton and State of Pennsylvania, have invented certain new and useful Improvements in Automobile Drive Mechanisms; and I do hereby declare the following to be a full, clear, and exact description of the invention, such as will enable others skilled in the art to which it appertains to make and use the same.

The invention relates to improvements in power transmission mechanisms, and more particularly to that type of such mechanisms adapted for transmitting power from the engine shaft to the driven axle, or axles, of an automobile.

The object of the invention is to provide a mechanism for the transmission of the maximum power from the engine shaft of an automobile, revolved in a given direction, to a driven axle, or axles, revolved in a direction at right angles to the engine shaft without reducing the speed of the driven axle, and the invention consists of certain improvements in, and more specific application of, the "radio-helical" cam for which Letters Patent of the United States were granted me on the 28th day of May, 1901, numbered 675,020, and on the 22nd day of March, 1904, numbered 755,051, such improvements to be hereinafter more fully described, set forth in the appended claims, and illustrated in the accompanying drawing.

For the purposes of distinguishing the construction of the cam-members arranged on the cam-plate, it has been designated as "radio-helical", since the helix usually acts co-axially, while, in the present instance, the helix defined by the motion of the cycloidal curve formation of the cam-members acts radially or trans-axially, or at right angles to the axis of the cam-plate, and in this construction the cam-members on the cam-plate are approximately the thickness of the spaces between the teeth of the gear driven by the cam-plate and its cam-members, and their working surfaces are of varying angularity to produce continuous leverage on the teeth of the gear driven thereby.

In the drawing:—

Figure 1 is a perspective view of the preferred embodiment of the invention,

Fig. 2 is a vertical longitudinal section showing the angular relation of the cam-plate and its cam-members to the gear, and, also, the method of accomplishing the inverse angularity of the several cam-members and the relation of their working surfaces to the co-acting teeth of the driven gear, Fig. 3 is an exaggerated plan view showing the generation of the several cam-members on a curve of cycloidal formation, Fig. 4 is a diagrammatical plan view illustrating the method of the development of the inverse angularity of the cam-members on a curve of cycloidal formation.

Fig. 5 is a detail view of a portion of the gear to illustrate the shape of the teeth.

Referring to the drawing, in which like characters of reference indicate similar parts on the several views, 1 designates a power or engine shaft which is integrally, or otherwise, connected at one end to a cam-plate 2 having its outer face provided with cam-members 3 (the number of such cam-members may, however, be other than the pair shown), formed on a curve of cycloidal formation, and whose pitch remains in constant fixed angularity of ninety degrees (90°) with respect to the path of travel of the edge of a gear 4, while the working surfaces of each cam-member 3 vary inversely throughout their lineal curve with respect to the body of the cam-plate 2 to maintain constant right-angular relation to the path of peripheral movement of the gear 4, when the latter is rotated.

Such fact or condition, above stated, exists by reason of the maintenance of absolute right-angularity between the cam-members 3 and the co-acting teeth 5 of the gear 4, or, in other words, such right-angular relation is rendered absolute by reason of the angular relation of the several cam-members 3 to the face of the cam-plate 2 varying inversely throughout their lineal curve, and, also, because of the axis of the gear teeth 5 being of absolute right-angularity with respect to the peripheral movement of the gear 4 and therefore, at right angles to the contours of the cam-members.

Each cam 3, at its root or inner end is beveled at 20, to readily engage the teeth of the gear wheel. The inner wall 21 of each cam acutely inclines, as at 22, the inclination gradually diminishing toward the outer end of the cam, and eventually merges into a straight wall 23, which is at right angle to the face of the cam plate 3. The outer wall 24, of each cam at the root is straight, or at right angle to the cam plate 2, as indicated at 24, (see Fig. 2) and it inclines gradually toward the outer end, where the inclination is the greatest as shown at 25. This specific construction serves to accomplish a most important function in the operation of my improvement as will presently appear.

The teeth of the gear wheel are constructed to coact with the cams, as it is essential that absolute intermeshing of the cam and teeth take place to accomplish the necessary result attributed to my improved construction.

Each tooth 5 is radial, and its opposite sides 5$^a$ are similar and are parallel. One inner surface 5$^b$ of each tooth is concave, while the opposite surface 5$^c$ is convex. Lines drawn through the corners 5$^d$ of the teeth would be parallel with the axis of the gear wheel, hence when the cam and gear are in mesh, the convex and concave surfaces of the teeth snugly engage the side walls of the cams, as clearly shown in Fig. 2.

To effect this registration, it is essential that one face of the gear wheel be in alinement with the axis of the cam shaft as shown in Fig. 3. It is obvious from an inspection of Fig. 3 that in any position of the cams the teeth engaging same will be snugly confined and that the force of the cam on the teeth will be at right angle to the axis of the cam plate. This action prevents lateral strain on the shaft and reduces the friction to such extent that a decided increase in efficiency is obtained.

The gear 4 is provided with spokes 6 radiating from a hub 7 which is formed at its opposite ends with the concentric bearing flange 8, which construction adapts the gear 4 for use, more particularly, in connection with a bevel-gear type of differential mechanism, as illustrated, and which mechanism consists of the bevel gear 9, two of such bevel gears being used, however, one for each section of a usual two-part drive axle, and which bevel gears are adapted to mesh with the bevel gears 10 carried by the studs 11 formed with the gear 4 and projecting inwardly from the inner periphery of the latter. These gears 9 are provided with bearing recesses (not shown) for the reception of the bearing flanges 8 of the hub 7, aforementioned.

It is to be noted that one face of the gear 4 is directly opposite the transverse center of the cam-plate 2 and to effect constant engagement of the working surfaces of the radio-helical cam-members 3 with the co-acting teeth 5 of the gear, the working surfaces of the same are made to vary inversely throughout their curved lineal relation to the cam-plate 2 to prevent binding of the next tooth thereon as the same revolves, the constant leverage of the cam-members being effected by the constant varying angle of such working surfaces of the cam-members, but which angularity remains in absolute right angular relation to the path of peripheral travel of the gear at all times.

It is understood that, without departing from the spirit of the invention, the radio-helical cam-members 3 on the cam-plate 2 may be varied in number and pitch, from that shown, according to the power and speed required, a reduction in pitch, producing a corresponding reduction in speed, and an increase in the pitch the opposite effect. This variation in number and pitch of the cam-members necessitates a corresponding variation in the number and pitch of the teeth on the gear.

Having thus fully described my invention, what I claim is:—

1. In power transmitting mechanism, the combination of a drive shaft, a cam plate at the end of the drive shaft, and provided on one face with a cam, driven elements including a gear wheel, the gear wheel being disposed at right angle to the cam plate, one surface of the gear being substantially in alinement with the axis of said cam plate, the gear having teeth formed to snugly engage the side walls of the cam when in meshing relation.

2. In power transmitting mechanism, the combination of a drive shaft, a cam plate at the end of the drive shaft, and provided on one face with a cam, the inner wall of the cam being inclined near its inner end and gradually merging into a straight position near its outer end, the outer wall of the cam being straight near its inner end and gradually inclining toward the outer end, a gear wheel disposed at right angle to the cam plate, one face of said gear wheel being in alinement with the axis of the cam plate, the teeth of the gear wheel having opposite parallel radial sides and one connecting surface convex and the opposite surface concave, the convex and concave surfaces corresponding to the curvature of the cam when in meshing relation, the gradually inclined walls of the cam compensating for the angular positions assumed by the teeth in the revolution of the gear wheel.

3. In power transmitting mechanism, the combination of a drive shaft, a cam plate at the end of the drive shaft and provided on one face with two cams spaced apart and overlapping, a gear wheel disposed at right angle to the cam plate, one surface of the gear wheel being substantially in alinement with the axis of said cam plate, the gear wheel having teeth formed to snugly engage the side walls of the cams when in meshing relation.

In testimony whereof I affix my signature, in presence of two witnesses.

HENRY J. SCHMICK.

Witnesses:
D. C. REINOHL,
W. PARKER REINOHL.